(12) United States Patent
Tanaka et al.

(10) Patent No.: US 11,918,983 B2
(45) Date of Patent: Mar. 5, 2024

(54) PRESSURE VESSEL

(71) Applicant: ARISAWA MFG. CO., LTD., Joetsu (JP)

(72) Inventors: Hiroshi Tanaka, Joetsu (JP); Yuichi Kawai, Joetsu (JP); Mikio Kuroda, Joetsu (JP)

(73) Assignee: ARISAWA MFG. CO., LTD., Joetsu (JP)

( * ) Notice: Subject to any disclaimer, the term of this patent is extended or adjusted under 35 U.S.C. 154(b) by 1328 days.

(21) Appl. No.: 16/462,072

(22) PCT Filed: Jun. 23, 2017

(86) PCT No.: PCT/JP2017/023129
§ 371 (c)(1),
(2) Date: May 17, 2019

(87) PCT Pub. No.: WO2018/092346
PCT Pub. Date: May 24, 2018

(65) Prior Publication Data
US 2019/0329202 A1   Oct. 31, 2019

(30) Foreign Application Priority Data

Nov. 21, 2016  (JP) ................................. 2016-225682

(51) Int. Cl.
| | | |
|---|---|---|
| *B01J 3/04* | (2006.01) | |
| *B01D 61/08* | (2006.01) | |
| *B01D 63/12* | (2006.01) | |
| *B29C 70/06* | (2006.01) | |
| *B29L 31/00* | (2006.01) | |

(52) U.S. Cl.
CPC .............. *B01J 3/048* (2013.01); *B01D 61/08* (2013.01); *B01J 3/042* (2013.01); *B01D 63/12* (2013.01);

(Continued)

(58) Field of Classification Search
CPC .... B01D 2313/44; B01D 35/30; B01D 63/02; B01D 61/147; B01D 61/145;

(Continued)

(56) References Cited

U.S. PATENT DOCUMENTS 4,600,512 A  *  7/1986  Aid ...................... B01D 65/027
                                                         210/450
4,685,589 A     8/1987  Benton
(Continued)

FOREIGN PATENT DOCUMENTS

| CN | 1955536 A | 5/2007 |
| CN | 1964775 A | 5/2007 |

(Continued)

OTHER PUBLICATIONS

Extended European Search Report dated Jun. 17, 2020 from the European Patent Office in EP Application No. 17872633.7.

(Continued)

*Primary Examiner* — Shawn M Braden
(74) *Attorney, Agent, or Firm* — Sughrue Mion, PLLC

(57) ABSTRACT

Provided is a highly practical pressure vessel in which there is minimal inside diameter deformation even if openings in a center inlet/outlet part are large, and there is little pressure-induced elongation from a center to both ends. This pressure vessel is composed of a tube body made of a fiber-reinforced resin, wherein: a center inlet/outlet part that lets a liquid in or out is provided to a tube-body-axial center part on a peripheral surface of the tube body; end-part inlet/outlet parts that let a fluid in or out are provided to tube-body-axial end parts of the tube body; the tube body is configured from a helical layer of which fibers are inclined at an angle of from ±40° to less than ±50° relative to a tube-body-axial direction, a reinforcing layer of which fibers are inclined at a greater angle than the helical layer relative to the tube- (Continued)

body-axial direction, and a seal layer constituting an innermost layer; a breakaway part that breaks away circumferentially outward from the seal layer is provided to a position on the helical layer where the center inlet/outlet part is provided; the reinforcing layer is configured from an inward reinforcing layer and an outward reinforcing layer provided respectively to inward and outward sides of the helical layer so as to enclose the breakaway part of the helical layer therebetween; and the center inlet/outlet part is provided so as to penetrate the inward reinforcing layer, the breakaway part of the helical layer, and the outward reinforcing layer.

9 Claims, 4 Drawing Sheets

(52) U.S. Cl.
CPC ....... *B29C 70/06* (2013.01); *B29L 2031/7156* (2013.01)

(58) Field of Classification Search
CPC .... B01D 2313/20; B01D 61/08; B01D 63/12; B01D 61/10; B01J 3/048; B01J 3/042; B29C 70/06; B29L 2031/7156; C02F 1/44; F16J 12/00
See application file for complete search history.

(56) References Cited

U.S. PATENT DOCUMENTS

| | | | | |
|---|---|---|---|---|
| 4,902,416 | A * | 2/1990 | Schroeder | ............ B01D 63/043 210/321.74 |
| 2007/0199878 | A1 | 8/2007 | Eisberg et al. | |
| 2008/0093367 | A1 | 4/2008 | Gilbertson et al. | |
| 2010/0206421 | A1 * | 8/2010 | Kawasetsu | .............. F16L 41/03 138/174 |
| 2014/0339239 | A1 * | 11/2014 | Kawai | .................... B01D 63/00 220/590 |

FOREIGN PATENT DOCUMENTS

| | | |
|---|---|---|
| CN | 203023787 U | 6/2013 |
| CN | 203907202 U | 10/2014 |
| EP | 1 742 724 A | 1/2007 |
| EP | 2 787 254 A1 | 10/2014 |
| EP | 2949449 A1 | 12/2015 |
| JP | 56-87405 A | 7/1981 |
| JP | 2007-533451 A | 11/2007 |
| JP | 4531091 B2 | 8/2010 |
| JP | 2013-117250 A | 6/2013 |
| JP | 2013-224856 A | 10/2013 |
| JP | 5400125 B2 | 1/2014 |

OTHER PUBLICATIONS

Japanese Office Action issued in JP 2016-225682 dated Aug. 20, 2018.
International Search Report of PCT/JP2017/023129 dated Sep. 26, 2017.
Communication dated Feb. 3, 2020 from the State Intellectual Property Office of the P.R.C. in Application No. 201780070974.9.
International Preliminary Report on Patentability and Written Opinion of the International Searching Authority for PCT/JP2017/023129 dated May 31, 2019.

* cited by examiner

PRESSURE VESSEL

CROSS REFERENCE TO RELATED APPLICATIONS

This application is a National Stage of International Application No. PCT/JP2017/023129 filed Jun. 23, 2017, claiming priority based on Japanese Patent Application No. 2016-225682 filed Nov. 21, 2016.

TECHNICAL FIELD

The present invention relates to a pressure vessel.

BACKGROUND ART

Reverse osmosis is one method of extracting fresh water from seawater. This is a method in which seawater is passed through a reverse osmosis membrane (e.g., a spiral membrane or a hollow fiber membrane), the seawater being subjected to a pressure of 800 to 1200 psi (5.5 to 8.3 MPa), which is 5.5 to 8.3 times the pressure of 1 MPa compressed air generated by a normal compressor, and the phenomenon of reverse osmosis is induced to obtain fresh water.

The reverse osmosis membrane is loaded into a pressure vessel in the form of a tube, but extremely high pressure resistance is required of the pressure vessel. Corrosion resistance is also required because the pressure vessel comes into contact with seawater and concentrated seawater. Therefore, it is common for the pressure vessel to be made of a pressure-resistant and corrosion-resistant fiber-reinforced plastic (FRP), and in many cases, the pressure vessel is formed using a filament winding (FW) molding technique.

Types of pressure vessels include a side-port type (refer to Patent Document 1) or an end-port type in which seawater is let in from a peripheral surface or end surface at one end of the pressure vessel and concentrated seawater is let out from the peripheral surface or end surface at another end, and a center-port type (refer to Patent Document 2) in which seawater is let in from the peripheral surface of a center part of the pressure vessel and concentrated seawater is let out from the peripheral surfaces or end surfaces of both end parts.

With a center-port-type pressure vessel, as is described in Patent Document 2, inlet/outlet parts for seawater at the center parts of pressure vessels can be linked together, and inlet/outlet parts for concentrated seawater at both end parts of pressure vessels can be linked together; therefore, this type of pressure vessel has the advantage of being able to save tube laying costs and installation area for linking pressure vessels together.

However, a center-port-type pressure vessel has drawbacks such as the following.

1) Openings for a seawater inlet/outlet part in the center part must be enlarged, because seawater is supplied from the center part to left and right reverse osmosis membranes. When the opening parts for the seawater inlet/outlet part are enlarged, many fibers of the opening parts are cut during boring; therefore, there are cases in which strength decreases, the inside diameter of the pressure vessel is largely deformed by pressure, and the seal properties of the reverse osmosis membranes are compromised. In such cases, seawater or concentrated seawater gets mixed into the fresh water that had been so laboriously obtained.

2) In a pressure vessel, deformation (lengthwise elongation) occurs as seawater under pressure is let in and concentrated seawater under pressure is let out, but in a center-port-type vessel, the elongation occurs from the center toward both ends. Therefore, unlike with a side-port or end-port-type vessel in which elongation occurs simply from one end side toward another end side, design or consideration is required to address elongation from the center toward both ends.

PRIOR ART DOCUMENTS

Patent Documents

[Patent Document 1] JP 5400125 B
[Patent Document 2] JP 4531091 B

DISCLOSURE OF THE INVENTION

Problems the Invention is Intended to Solve

However, in Patent Document 2, no reference of any kind is made to 1) addressing the compromising of seal properties that occurs with the enlarging of the openings of the seawater inlet/outlet part in the center, or to 2) addressing the pressure-induced elongation from the center towards both ends.

A pressure vessel used in reverse osmosis requires, from the perspective of the operation thereof (seawater desalination by reverse osmosis), that:

A) during the operation of seawater desalination by reverse osmosis, there be no water leakage from the center port, side port, or end port in contact with a seawater or concentrated seawater inlet/outlet part or with parts that close off the openings at both ends of the pressure vessel; and B) the pressure vessel not rupture in the midst of operation.

In the International Requirement Standards ASME Section X (ten) for FRP pressure vessels, stipulations for water leakage and pressure resistance are as follows.

A) In a production test, there must be no water leakage at pressures of 100% and 110% the design pressure (total inspection).

Example: When the design pressure is 1000 psi (6.9 MPa), there must be no water leakage at 1000 psi (6.9 MPa) or at a pressure 110% as great, which would be 1100 psi (7.59 MPa).

B) In a qualification test conducted before the pressure vessel is manufactured, a pressure between zero pressure (atmospheric pressure) and the design pressure is to be repeatedly applied and withdrawn 100,000 times, during which time there must be no water leakage. Furthermore, the pressure vessel to which this pressure was repeatedly applied and withdrawn 100,000 times must have the capacity to withstand six times the design pressure (qualification inspection before mass production).

Example: When the design pressure is 1000 psi (6.9 MPa), there must be no water leakage while a pressure between 0 and 1000 psi (6.9 MPa) is applied and withdrawn. The pressure vessel to which this pressure was repeatedly applied and withdrawn 100,000 times must have the capacity to withstand six times the design pressure, which would be 6000 psi (41.4 MPa).

To satisfy these requirements, the deformation of the pressure vessel must be minimized in relation to the operating pressure (design pressure), and water must be prevented from leaking from the center port, side port, or end port in contact with a seawater or concentrated seawater inlet/outlet part or with parts that close off openings at both ends of the pressure vessel. Additionally, pressure resistance is required.

The present invention was devised in view of such circumstances as are described above, the invention providing a highly practical center-port-type pressure vessel wherein there is minimal inside diameter deformation even if openings of a center inlet/outlet part are large, and there is little pressure-induced elongation from the center toward both ends.

Means for Solving these Problems

The main points of the present invention are described below with reference to the attached drawings.

A first aspect of the present invention relates to a center-port-type pressure vessel used in seawater desalination or water purification by reverse osmosis, the pressure vessel comprising a tube body 1 made of a fiber-reinforced resin, wherein the pressure vessel is characterized in that: a center inlet/outlet part 2 that lets a liquid in or out is provided to a tube-body-axial center part on a peripheral surface of the tube body 1; end-part inlet/outlet parts 3 that let a fluid in or out are provided to tube-body-axial end parts of the tube body 1; the tube body 1 is configured from a helical layer 4 of which fibers are inclined at an angle of from ±40° to less than ±50° relative to a tube-body-axial direction, a reinforcing layer of which fibers are inclined at a greater angle than the helical layer 4 relative to the tube-body-axial direction, and a seal layer 20 constituting an innermost layer; a breakaway part 5 that breaks away circumferentially outward from the seal layer 20 is provided to a position on the helical layer 4 where the center inlet/outlet part 2 is provided; the reinforcing layer is configured from an inward reinforcing layer 6 and an outward reinforcing layer 8 provided respectively to inward and outward sides of the helical layer 4 so as to enclose the breakaway part 5 of the helical layer 4 therebetween; and the center inlet/outlet part 2 is provided so as to penetrate the inward reinforcing layer 6, the breakaway part 5 of the helical layer 4, and the outward reinforcing layer 8.

A second aspect of the present invention relates to a center-port-type pressure vessel used in seawater desalination or water purification by reverse osmosis, the pressure vessel comprising a tube body 1 made of a fiber-reinforced resin, wherein the pressure vessel is characterized in that: a center inlet/outlet part 2 that lets a liquid in or out is provided to a tube-body-axial center part on a peripheral surface of the tube body 1; end-part inlet/outlet parts 3 that let a fluid in or out are provided to tube-body-axial end parts on the peripheral surface of the tube body 1; the tube body 1 is configured from a helical layer 4 of which fibers are inclined at an angle of from ±40° to less than ±50° relative to a tube-body-axial direction, a reinforcing layer of which fibers are inclined at a greater angle than the helical layer 4 relative to the tube-body-axial direction, and a seal layer 20 constituting an innermost layer; breakaway parts 5 that break away circumferentially outward from the seal layer 20 are provided to positions on the helical layer 4 where the center inlet/outlet part 2 and the end-part inlet/outlet parts 3 are provided; the reinforcing layer is configured from inward reinforcing layers 6, 7 and outward reinforcing layers 8, 9 provided respectively to inward and outward sides of the helical layer 4 so as to enclose the breakaway parts 5 of the helical layer 4 therebetween; and the center inlet/outlet part 2 and the end-part inlet/outlet parts 3 are provided so as to penetrate the inward reinforcing layers 6, 7, the breakaway parts 5 of the helical layer 4, and the outward reinforcing layers 8, 9.

A third aspect of the present invention relates to the pressure vessel of the second aspect, characterized in that the fibers of the center inward reinforcing layer 6 or the center outward reinforcing layer 8 provided so as to be penetrated by the center inlet/outlet part 2 are inclined at an angle of from ±60° to ±80° relative to the tube-body-axial direction.

A fourth aspect of the present invention relates to the pressure vessel of either the second or third aspect, characterized in that the fibers of the end-part inward reinforcing layers 7 or the end-part outward reinforcing layers 9 provided so as to be penetrated by the end-part inlet/outlet parts 3 are inclined at an angle of from ±85° to ±89° relative to the tube-body-axial direction.

A fifth aspect of the present invention relates to the pressure vessel of any one of the first through fourth aspects, characterized in that the seal layer 20 comprises a base material in which a fiber orientation is randomly isotropic, and the same matrix resin as a matrix resin of the helical layer 4 and the reinforcing layers.

A sixth aspect of the present invention relates to the pressure vessel of the fifth aspect, characterized in that a resin content of the seal layer 20 is greater than a resin content of the helical layer 4 and the reinforcing layer.

A seventh aspect of the present invention relates to the pressure vessel of the sixth aspect, characterized in that the resin content of the seal layer 20 is set to 40 mass % or more and 85 mass % or less, and the resin content of the helical layer 4 and the reinforcing layer is set to 20 mass % or more and 30 mass % or less.

An eighth aspect of the present invention relates to the pressure vessel of any one of the first through seventh aspects, characterized in that portions of the helical layer 4 other than the breakaway parts 5 are in contact with the seal layer 20.

Effect of the Invention

Because the present invention is configured as described above, a highly practical pressure vessel is achieved in which there is minimal inside diameter deformation even if openings in the center inlet/outlet part are large, and there is little pressure-induced elongation from the center toward both ends.

BEST MODE FOR CARRYING OUT THE INVENTION

Figure 1:
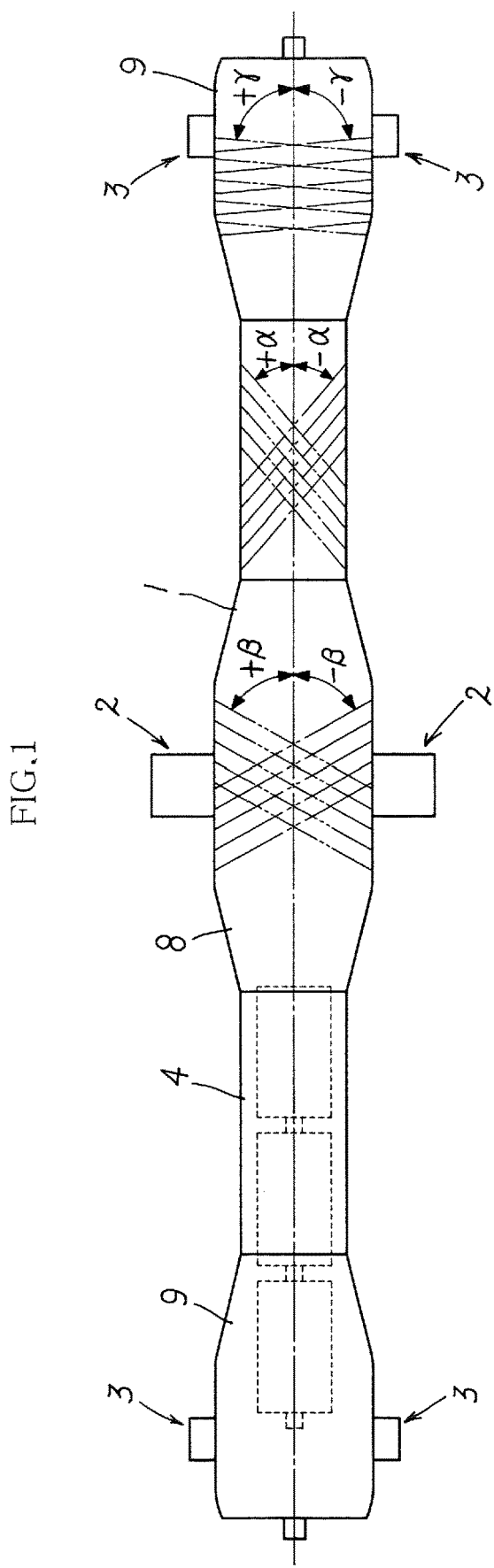
FIG. 1 is a schematic explanatory side view of the present example.

Preferred embodiments of the present invention are briefly described below with reference to the diagrams while indicating the effects of the present invention.

A broken away state (undulating state) of a breakaway part 5 of a helical layer 4 is held by an inward reinforcing layer 6 and an outward reinforcing layer 8 enclosing the breakaway part 5 therebetween, whereby strength is maintained not only by shearing force between layers, but also by a force that divides fibers of the helical layer 4.

Particularly, in a center-port-type pressure vessel, an opening of a center inlet/outlet part 2 must be larger in diameter, and deformation in a diametrical direction near the center inlet/outlet part 2 poses a problem, but deformation in the diametrical direction near the center inlet/outlet part 2 can be minimized by the structure of the helical layer 4 in an undulating state.

The fibers of the helical layer 4 are inclined at an angle of from ±40° to less than ±50° relative to an axial direction of a tube body, whereby lengthwise elongation of a tube body 1 can be satisfactorily minimized.

Furthermore, a configuration employed for a seal layer 20 is composed of a base material in which a fiber orientation is randomly isotropic, and the same matrix resin as a matrix resin of the helical layer 4 and the reinforcing layers, whereby a sturdy seal layer 20 can be formed on an innermost layer. Consequently, a barrel part of the tube body 1 is satisfactorily waterproof.

EXAMPLES

Specific examples of the present invention shall be described with reference to the diagrams.

The present example is a center-port-type pressure vessel used in seawater desalination or water purification by reverse osmosis, the pressure vessel comprising a tube body 1 made of a fiber-reinforced resin, wherein: a center inlet/outlet part 2 that lets a liquid in or out is provided to a tube-body-axial center part on a peripheral surface of the tube body 1; end-part inlet/outlet parts 3 that let a fluid in or out are provided to tube-body-axial end parts on the peripheral surface of the tube body 1; the tube body 1 is configured from a helical layer 4 of which fibers are inclined at an angle of from ±40° to less than ±50° relative to a tube-body-axial direction, a reinforcing layer of which fibers are inclined at a greater angle than the helical layer 4 relative to the tube-body-axial direction, and a seal layer 20 constituting an innermost layer; breakaway parts 5 that break away circumferentially outward from the seal layer 20 are provided to positions on the helical layer 4 where the center inlet/outlet part 2 and the end-part inlet/outlet parts 3 are provided; the reinforcing layer is configured from inward reinforcing layers 6, 7 and outward reinforcing layers 8, 9 provided respectively to inward and outward sides of the helical layer 4 so as to enclose the breakaway parts 5 of, the helical layer 4 therebetween; and the center inlet/outlet part 2 and the end-part inlet/outlet parts 3 are provided so as to penetrate the inward reinforcing layers 6, 7, the breakaway parts 5 of the helical layer 4, and the outward reinforcing layers 8, 9.

Close-off lids 10 that close off the tube body 1 are provided to the tube-body-axial end parts of the tube body 1.

The tube body 1 of the present example is a cylindrical object formed by: using a publicly known filament winding method to continuously wind a necessary amount of glass fibers over a cylindrical mandrel (in which the layer that will become the hereinafter-described seal layer 20 is formed) at a predetermined angle of inclination relative to an axial direction of the mandrel (the axial direction of the tube body 1), the glass fibers being impregnated with resins including epoxy resins and curing agents thereof; heat-curing the epoxy resins; and then removing the mandrel. The tube body 1 is used in seawater desalination and/or water (ultra) purification.

Specifically, in a predetermined area on the mandrel that will become the entire axial area of the tube body 1, a tape-form base material in which a fiber orientation is randomly isotropic is continuously wound over the mandrel so that end parts overlap at a predetermined wrap (a range of ¼ to ¾), and the base material is impregnated with a matrix resin, forming a resin-impregnated layer that will become the seal layer 20.

Next, on the resin-impregnated layer that will become the seal layer 20, a resin-impregnated layer that will become the inward reinforcing layers 7 (hoop layers) at both end parts is formed by hoop winding at an angle ±γ of from ±85° to ±89° relative to the axial direction of the mandrel from (along the axial direction) outward end parts of the close-off lids 10 (the designated positions where the close-off lids will be provided) to positions set apart a predetermined distance from inward end parts of the end-part inlet/outlet parts 3 (the designated positions where such will be provided), and a resin-impregnated layer that will become the center inward reinforcing layer 6 is formed by winding at an angle ±β of from ±60° to ±80° relative to the axial direction of the mandrel in a predetermined range in the periphery of the center inlet/outlet part 2 (the designated position where such will be provided).

Next, a resin-impregnated layer that will become the helical layer 4 is formed by helical winding at an angle ±α of from ±40° to less than ±50° over the entire axial area of the tube body 1. At this time, the breakaway parts 5 that have broken away from the seal layer 20 by being provided along the inward reinforcing layers 6, 7 are formed on the resin-impregnated layer that will become the helical layer 4 (portions other than the breakaway parts 5 are in a state of contact with the seal layer 20).

Next, on the resin-impregnated layer that will become the helical layer 4, a resin-impregnated layer that will become the outward reinforcing layers 9 (hoop layers) at both end parts is formed by hoop winding at an angle ±γ of from ±85° to ±89° from the positions of the tube-body-axial end parts of the tube body 1 to positions farther inward than the inward end parts of the inward reinforcing layers 7 at both end parts (positions inward of the regions where the broken away helical layer 4 comes into contact with the seal layer 20), and a resin-impregnated layer that will become the center outward reinforcing layer 8 is formed by winding at an angle ±β of from ±60° to ±80° up to positions farther outward than both end parts of the center inward reinforcing layer 6 (positions outward of the regions where the broken away helical layer 4 comes into contact with the seal layer 20).

The resin-impregnated layers are then heat-cured and the mandrel is taken out (removed), thereby yielding a tube body 1 in which the fibers of the helical layer and the reinforcing layer are inclined at the above-described angles relative to the axis.

Epoxy resins are not provided by way of limitation; polyester resins, vinyl resins, and other resins may be used, and glass fibers are not provided by way of limitation; carbon fibers and other fibers may be used. Additionally, the matrix resin of the seal layer 20 is preferably the same resin as the matrix resin of the helical layer 4 and the reinforcing layer because adhesion is further improved. The starting points of the inward reinforcing layers 7 at both end parts may be positions set apart a predetermined distance from the outward end parts of the close-off lids 10, and the ending points may be the inward end part positions of the end-part inlet/outlet parts 3 (preferably set to positions such that the hole peripheries do not deform during the boring of the inlet/outlets). There is no need for the fiber angles to be the same among the inward reinforcing layers 6, 7 and the outward reinforcing layers 8, 9; these angles may be different as long as they are within the ranges given above.

In the present example, the resin content of the seal layer 20 after heat-curing is set to 40 mass % or more and 85 mass % or less, and the resin content of the helical layer 4 and the reinforcing layer (the inward reinforcing layers 6, 7 and the outward reinforcing layers 8, 9) is set to 20 mass % or more and 30 mass % or less. The seal layer 20 is thereby made even more satisfactorily waterproof (sealed).

Figure 2:
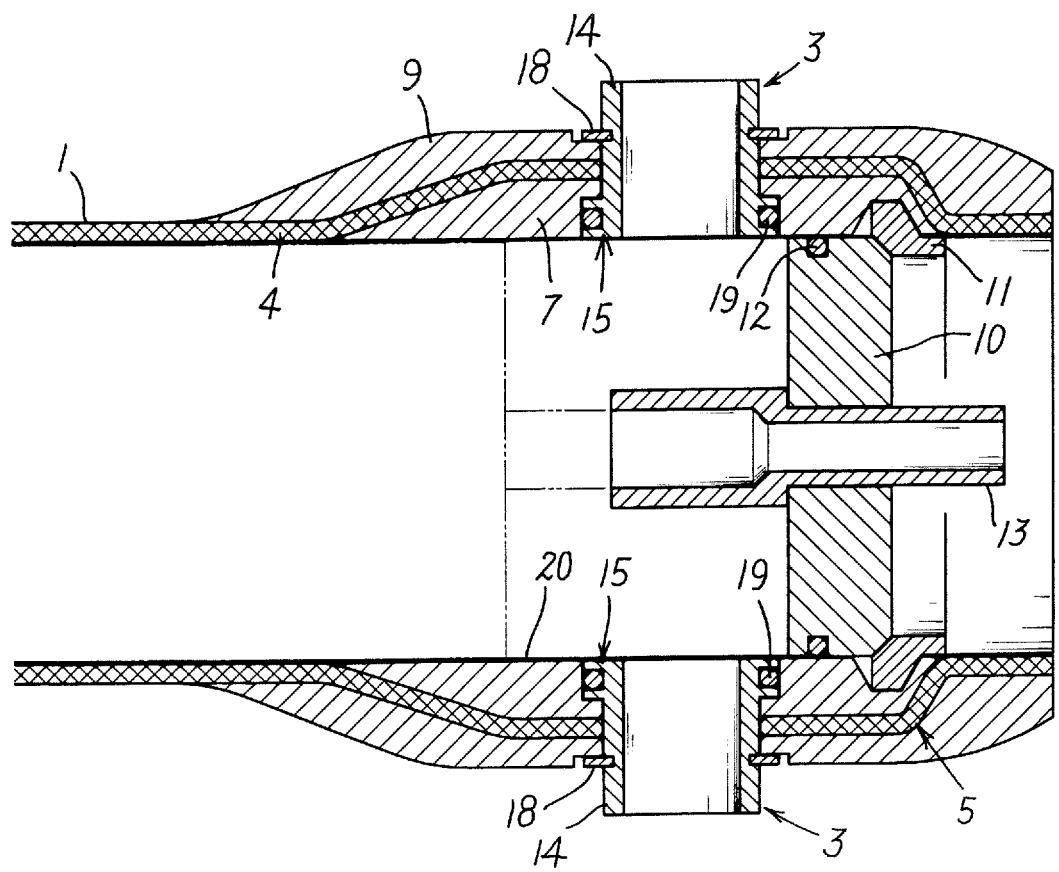
FIG. 2 is an enlarged schematic explanatory cross-sectional view of the vicinity of an end-part inlet/outlet part of the present example.

Both end parts of the tube body 1 are closed off by joining the close-off lids 10, which are substantially equal in diameter to an inner peripheral surface of the tube body 1 and made of a fiber-reinforced resin (a FRP), using bolts (not shown) to retainer rings 11 made of FRP and placed in recesses provided in the inner peripheral surface of the tube body 1, as shown in FIG. 2. In the drawing, the symbol 12 indicates an O-ring that closes off the gap between a close-off lid and the inner peripheral surface of the tube body 1, and 13 indicates a communication tube that allows communication between an external freshwater extraction tube and a freshwater passage, through which fresh water passes, of a reverse osmosis membrane inside the tube body 1.

The recesses provided in the inner peripheral surface of the tube body 1 where the retaining rings will be placed may be provided merely by cutting the inner peripheral surface (the inward reinforcing layers) of the tube body 1 to form recessed grooves, or ring bodies, etc., may be fitted over the mandrel when the fibers are wound in advance and the recesses where the retaining rings will be placed may be formed in the inner peripheral surface by these ring bodies. Additionally, when the inner peripheral surface is cut to form recessed grooves, the shapes of the inward reinforcing layers are preferably set so that the helical layer 4 is not cut.

Provided in the center part of the tube body 1 is a positioning locking part (not shown), into which an outer peripheral part of an inner end part of the loaded reverse osmosis membrane is locked. A configuration similar to the retaining rings for securing the close-off lids described above can be employed as this positioning locking part.

The end-part inlet/outlet parts 3 are provided near to the inward sides of the close-off lids, in terms of the axial direction of the tube body 1, as shown in FIGS. 1 and 2. Specifically, each of the end-part inlet/outlet parts 3 is composed of inlet/outlet holes formed through the peripheral surface of the tube body 1, and a barrel 14 provided in the inlet/outlet hole and having flange parts 15 in each end side. The flange parts 15 of the barrel 14 are locked into stepped parts provided to the inner peripheral surface of the tube body 1.

Therefore, in the present example, the helical layer 4 is shaped so as to break away (separate) circumferentially outward (radially outward) from the seal layer 20 and curve (undulate) into an arch near the center inlet/outlet part 2 and near the close-off lids and end-part inlet/outlet parts 3, as shown in FIG. 2.

Figure 3:
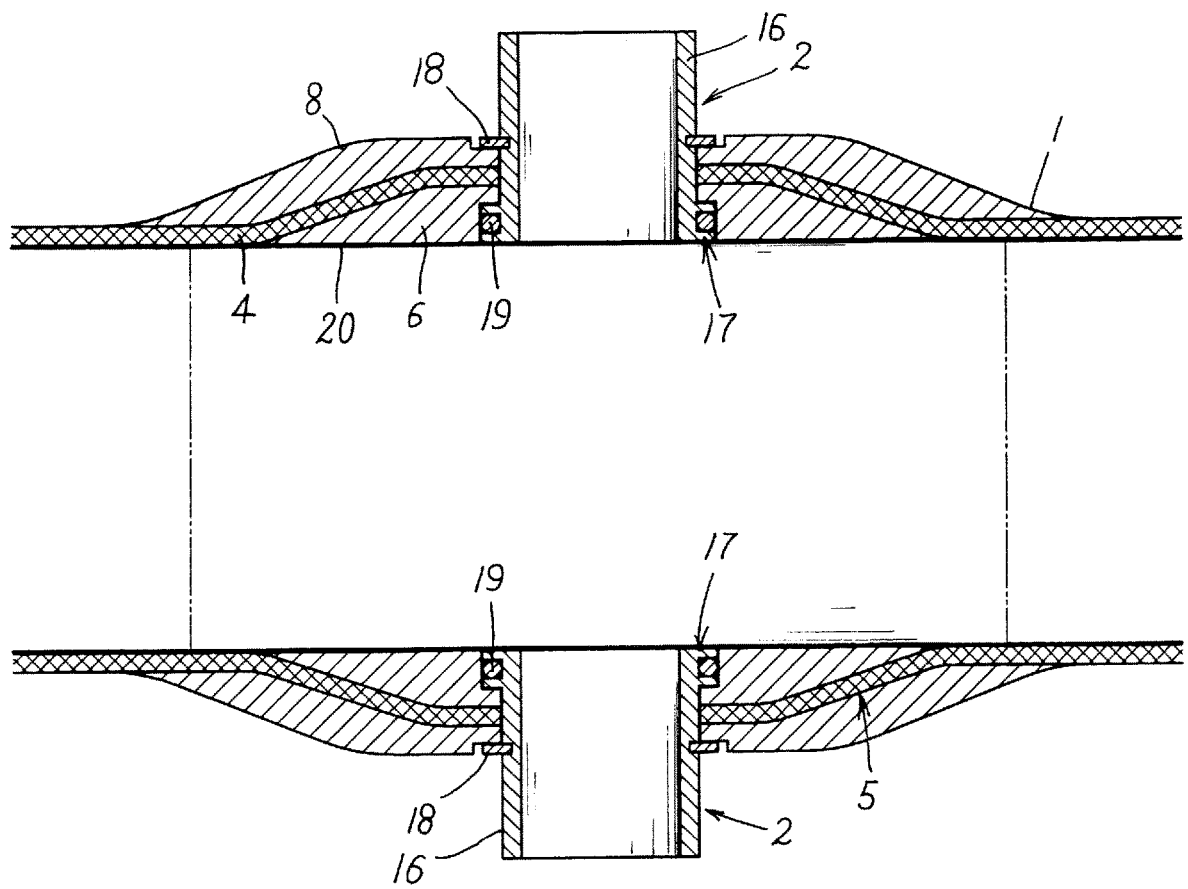
FIG. 3 is an enlarged schematic explanatory cross-sectional view of the vicinity of a center inlet/outlet part of the present example.

The center inlet/outlet part 2 is provided to the center part of the tube body 1. As shown in FIG. 3, the center inlet/outlet part 2, as are the end-part inlet/outlet parts 3, is composed of inlet/outlet holes formed through the peripheral surface of the tube body 1, and a barrel 16 provided in the inlet/outlet hole and having flange parts 17 at each side. The flange parts 17 of the barrel 16 are locked into stepped parts provided to the inner peripheral surface of the tube body 1.

The inlet/outlet holes to which the barrels 14, 16 are provided in the present example are formed through 12 o'clock and 6 o'clock positions as seen in a view of the end surface of the tube body 1, so as to penetrate the inward reinforcing layers 6, 7, the helical layer 4, and the outward reinforcing layers 8, 9.

In the drawings, the symbols 18 indicate snap rings that lock a barrel into the tube body 1, and the symbols 19 indicate O-rings.

Both end parts and the center part of the helical layer 4 are enclosed between the inward reinforcing layers 6, 7 and the outward reinforcing layers 8, 9 (a "sandwich" structure), the arch shapes of the breakaway parts 5 of the helical layer 4 are held, the helical layer 4 is also unlikely to deform into an ellipsoid in addition to the perfect circular shape maintaining effect provided by the two reinforcing layers in the peripheries of the inlet/outlet parts, and the perfect circular shape is satisfactorily maintained by the boring of the inlet/outlet parts as well (the perfect circular shape in a transverse cross section, which is a characteristic of the hoop layer, etc., is maintained because the inward reinforcing layers 6, 7 and the outward reinforcing layers 8, 9 constitute a sandwich structure). Consequently, the O-rings 12 of the close-off lids 10 exhibit a satisfactory waterproofing effect, and the seals (O-rings and/or V-rings) in the reverse osmosis membrane (described hereinafter) exhibit satisfactory seal properties. Additionally, a rising angle of both end parts of the breakaway parts 5 of the helical layer 4 is set to 90 degrees or less.

The center inlet/outlet part 2 is set to a larger diameter than the end-part inlet/outlet parts 3. The reason for this is as follows.

For example, when six reverse osmosis membranes are loaded, in a center-port-type pressure vessel, three are placed on the left side of the center part, three are placed on the right side of the center part, and seawater is fed into the left and right reverse osmosis membranes from the center inlet/outlet part 2 (the center port). In this case, there is a parallel connection of three+three membranes. When the number of parallel connections is increased, the introduced amount (supplied amount) of seawater fed into the reverse osmosis membranes must be increased. Therefore, a pump that generates a large flow rate is needed for a high-pressure pump that lets in seawater.

A serial connection is adopted when the pressure vessel is, for example, an end-port-type or a side-port-type vessel. When the number of serial connections is increased, it is not necessary for a large flow rate to be generated in the high-pressure pump that lets in seawater (the pump needs only a small capacity), but pressure is lost between an entry side and an exit side of the reverse osmosis membranes. For example, when there are six reverse osmosis membranes in a side-port (or even an end-port)-type pressure vessel, pressure is lost between the serial connections from the first reverse osmosis membrane to the sixth reverse osmosis membrane (from the letting in of seawater until the discharging of concentrated seawater). In other words, in the case of a serial arrangement as in a side-port-type vessel, there is appreciable pressure loss from the letting in of seawater until the discharging of concentrated seawater. If there is appreciable pressure loss, seawater desalination is less efficient.

Specifically, to cause a center-port-type pressure vessel to exhibit an operative effect such as that described in Patent Document 2, or to cause a center-port-type pressure vessel to effectively function as a seawater desalination device in which reverse osmosis membranes are connected in parallel by a center port, the amount of seawater let in from the center inlet/outlet part 2 must be increased, and to do so, the diameter (hole diameter) of the center inlet/outlet part 2 must be increased.

For example, when holes are opened in the 12 o'clock and 6 o'clock positions as seen in a view of an end surface of a peripheral surface (side part) of an FRP pressure vessel, the vessel is deformed into an ellipsoid in which the position from 12 o'clock to 6 o'clock is a minor diameter and the position from 3 o'clock to 9 o'clock is a major diameter (refer to paragraph [0018] in Patent Document 1). This phenomenon of ellipsoidal deformation becomes more pronounced with a larger diameter of the seawater inlet hole; for example, in a pressure vessel having an 8-inch inside diameter, ellipsoidal deformation is greater with a 3-inch hole diameter than with a 2-inch hole diameter, and greater with a 4-inch hole diameter than with a 3-inch hole diameter. A similar phenomenon occurs even with a seawater inlet hole (center inlet/outlet part 2) opened in the center of a center-port-type pressure vessel, and if the vessel undergoes elliptical deformation, the seal properties of the seals (O-rings or V-rings) in the reverse osmosis membranes placed on both sides of the center port are compromised (if the shape of the inner peripheral side of the pressure vessel is ellipsoidal whereas the shape of the outer peripheral side of a reverse osmosis membrane is perfectly circular, the seal positioned on the outer periphery of the reverse osmosis membrane and the inner periphery of the pressure vessel will have a gap on the major axis side of the ellipsoid and seal properties will be compromised). Otherwise, the minor-axis-side length of the ellipsoid of the pressure vessel will be less than the diameter of the reverse osmosis membrane, and there will be a problem in that the reverse osmosis membrane cannot be loaded into the pressure vessel.

To minimize this ellipsoidal deformation, in the present example, the breakaway parts 5 are provided to the helical layer 4, and reinforcing layers are provided to both the inward and outward sides of the breakaway parts 5. For example, when a center inlet/outlet part 2 having a 4-inch hole diameter is provided to a pressure vessel having an 8-inch inside diameter (hole diameter of center inlet/outlet part 2/inside diameter of pressure vessel (tube body 1): 4 inches/8 inches; opening ratio: 50%), the thicknesses of the inward reinforcing layers, the helical layer 4, and the outward reinforcing layers must all be increased in order to minimize ellipsoidal deformation. Due to the increase in thickness, the amounts of glass fibers and resins added increase, the winding time for the winding step is longer, and the costs of materials and machining therefore increase.

In the present example, filament winding is performed by winding the inward reinforcing layer 6 and the outward reinforcing layer 8, which are in the center where the center inlet/outlet part 2 is provided, at an angle of from ±60° to ±80°. Winding in this manner makes it possible to avoid cutting of the fibers by the boring of the center port, minimize deformation accordingly without increasing the thickness of the layers, and minimize the costs of materials and machining, in addition to the advantage of rigidity being maintained by the sandwich structure of Patent Document 1.

The following is a description of the how many of glass fibers are cut in a case in which filaments are wound using glass fiber strips measuring 10 mm in width and a 4-inch (100 mm) hole for letting in seawater is opened.

Figure 4:
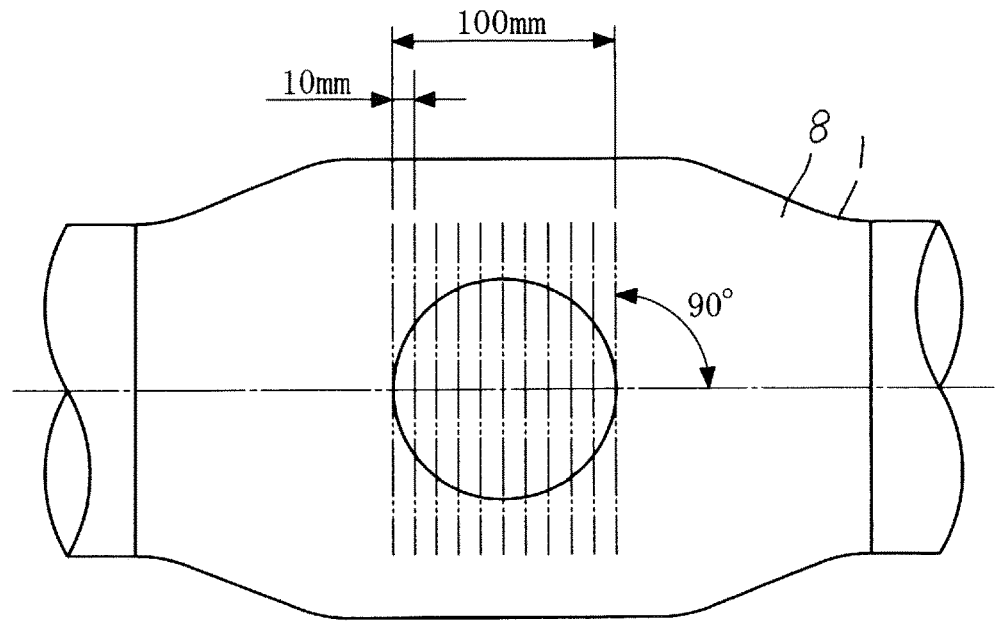
FIG. 4 is a schematic explanatory drawing that illustrates a relationship between an angle of fibers in a center inward reinforcing layer and outward reinforcing layer, and the number of fibers cut during boring.
Figure 5:
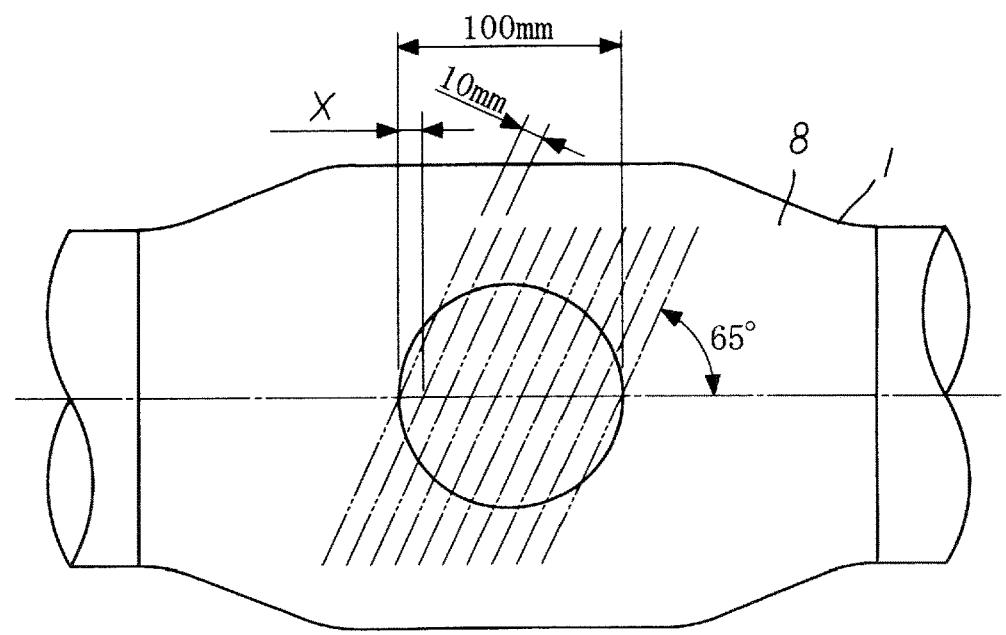
FIG. 5 is a schematic explanatory drawing that illustrates a relationship between an angle of fibers in the center inward reinforcing layer and outward reinforcing layer, and the number of fibers cut during boring.

For example, when the winding angle is 90° as shown in FIG. 4, the angle of inclination of the fibers is 90° relative to the axis of the pressure vessel (the tube body), and ten (100 mm/10 mm) glass fibers are therefore cut. Additionally, for example, when the winding angle is 65° as shown in FIG. 5, the angle of inclination of the fibers is 65° relative to the axis of the pressure vessel (the tube body); therefore, a length X over which one glass fiber measuring 10 mm in width intersects the 12 o'clock-6 o'clock diameter of the hole of the inlet/outlet part is $X=10/\cos(90-65)=11.0338$ mm, and the number of glass fibers covering 100 mm is 100 mm/11.0388 mm=9.0631, so that roughly nine glass fibers are cut.

Similarly, when the winding angle is ±89° as in Patent Document 1, the length X is $10/\cos(90-89)=10.0015$ mm, and the number of glass fibers covering 100 mm is 100 mm/10.0015 mm=9.99851, so that approximately 10 glass fibers are cut, as is the case with a winding angle of 90 degrees. With a winding angle of 90°, ten (approximately ten also with a winding angle of ±89°) glass fibers are cut, and with a winding angle of 65°, 9.0631 glass fibers are cut. Because of this, a winding angle of 65° needs only 9.37% of the fibers to be cut in comparison with a winding angle of 90°.

When the same calculation is performed in the case of Patent Document 1 with the winding angle at ±85° to ±89° to determine how many fibers do not need to be cut in comparison to a 90° winding angle, the amount with ±85° is 0.38% less than with 90°, and the amount with ±89° is 0.02% less than with 90°. In comparison, when this calculation is performed in the case of present example with the winding angle at ±60° to ±80°, the amount with ±60° is 13.4% less than with 90°, and the amount with ±80° is 1.52% less than with 90°. For example, when a hole measuring 100 mm in diameter is formed, the extent to which fewer fibers need to be cut stops at a level of less than 0.5% in the case of ±85° to ±89° in Patent Document 1, in comparison to a winding angle of 90°. In the case of ±60° to ±80° in the present example, when a hole measuring 100 mm in diameter is formed, the extent to which fewer fibers need to be cut is a level of 1.5% to 13% in comparison to a winding angle of 90°.

When the winding angle in the center port region is from ±60° to ±80°, the winding is no longer general "hoop winding"; therefore, the force holding the true circle shape of this region theoretically decreases (hoop winding is normally applied in order to maintain the circular shape of the cross section with FRP, and it is therefore difficult to hold the circular shape of the cross section with a winding angle smaller than that of hoop winding (90° or from ±85° to ±89°), but in practice, it was clear that the effect of ellipsoidal deformation occurring when the holes of the inlet/outlet parts are formed is far greater (a fiber angle at which fiber cutting can be minimized is preferred). With two 4-inch inlet/outlet part holes opened in positions at a 180° diagonal in an actual center-port-type pressure vessel having an 8-inch inside diameter, the ellipticity (major diameter–minor diameter) was 0.64 mm in the 85° (hoop winding) case of Patent Document 2, in which the position of 12 o'clock-6 o'clock after the hole was opened was the minor diameter and the position of 3 o'clock-9 o'clock was the major diameter. By contrast, the ellipticity in the ±70° case of the present example was greatly improved at 0.31 mm. In the case of a pressure vessel having an 8-inch inside diameter, seal properties are compromised when the ellipticity exceeds 0.4 mm, and the inventors have therefore set the ellipticity to 0.4 mm or less in a production test for the pressure vessel. In practice, in a pressure application water leakage test conducted at a design pressure of 1000 psi (6.9 MPa) based on International Standards ASME Section X, water leakage was confirmed when the angle of inclination of the fibers relative to the tube body axis was ±85°, and at ±65°, the pressure vessel had satisfactory performance with no confirmed water leakage.

In a center-port-type pressure vessel, lengthwise elongation extends from a seawater inlet part in the center toward concentrated seawater discharge parts at both ends. With the configuration of Patent Document 1, in which the hoop winding is from ±85° to ±89° and the helical winding is from ±50° to ±60°, assuming a center-port vessel to have the same entire length of 8-10 mm as a side-port vessel, there is a tendency with a side-port vessel to assume that the amount of elongation from the center is 4-5 mm to the right end and 4-5 mm to the left end for a total length of 8-10 mm equal in both directions, but the elongation is not necessary equal in both directions in practice. In practice, sometimes the reverse osmosis membrane on the left end side first fills with water, which leaks to the right end side which then fills with water, and the behavior of the elongation is erratic. Even if the features of Patent Document 1 or the features of sources other than Patent Document 1 are applied to a center-port-type pressure vessel, a countermeasure to elongation must be taken, such as endowing mobility to the region of the pressure vessel attached to a frame at the side where concentrated seawater is discharged.

Specifically, when the pressure vessel is installed on a frame, the pressure vessel is laid on two or three beams of the frame, but when the beams and the pressure vessel are all secured with a U band, etc., elongation cannot be absorbed in the above-described case of appreciable elongation. Therefore, consideration must be given to absorbing the elongation, e.g., between the beams and the pressure vessel there must be a movable attachment mechanism composed of rails secured to the beams and a block supporting the pressure vessel, the mechanism being provided, inter alia, with a linear guide via which the block is guided on the rails to reciprocate rectilinearly. When there is little elongation, it is possible to fabricate a configuration in which a freshwater extraction tube provided to an end part is made into a flexible tube or fashioned into the shape of a letter U or J, whereby the elongation is canceled out at the curved portions.

The movable attachment mechanism would require a rigid structure such as one that would withstand the weight of the pressure vessel on the installation frame of the pressure vessel, the weight of the reverse osmosis membrane inside the pressure vessel, and the weight of the moisture contained in the reverse osmosis membrane. The costs of the mechanism and the structure would be high.

Concerning this issue, when the winding angle of the fibers of the filament winding (i.e., the angle of inclination of the fibers in the helical layer 4 relative to the tube body axis) in the pressure vessel barrel parts to the left and right of the center port (the center inlet/outlet part 2) are changed from the range of ±50° to ±60° in Patent Document 1 to the range of ±40° to less than ±50° (the control value having a median of ±45°), the lengthwise elongation can be minimized to 0.5-1 mm, and an advantage is attained in that the mechanism for attaching the pressure vessel to a frame at the concentrated seawater discharge side does not need to be movable (some lengthwise elongation does occur (the elongation is not zero), and it is therefore preferable to either make the freshwater extraction tube at the concentrated seawater discharge side into a flexible tube, fashion this tube into the shape of the letter U, or provide a mechanism that cancels lengthwise deformation).

When seawater is let in through the center port in the center of the pressure vessel, the pressure of the seawater causes force to be exerted that would cause lengthwise ellipsoidal deformation in the hole diameters of the opening parts in contact with the flange parts 17 of the center part shown in FIG. 3. Due to the ellipsoidal deformation of the openings, the O-rings 19 can no longer be in contact with the side walls of the opening parts, and water leaks out. This tendency is more prominent with larger opening sizes; in other words, the extent of the ellipsoidal deformation is greater with a greater amount by which the fibers are cut.

However, in the present example, lengthwise elongation is minimized, and as a result, ellipsoidal deformation of the opening parts is also minimized and satisfactory seal properties of the O-rings can be preserved.

Specifically, openings that are at maximum 3 inches can be used when a configuration in which the fiber angles are from ±85° to ±89° in the inward reinforcing layers 7 and outward reinforcing layers 9 at both end parts where the end-part inlet/outlet parts 3 are provided is applied to the opening parts (provided at two locations positioned at a 180° diagonal) in the center of the tube body 1 having an 8-inch inside diameter. When a configuration in which the fiber angles of the center inward reinforcing layer 6 and outward reinforcing layer 8 are set to a value from ±60° to ±80° and the fiber angle of the helical layer 4 is set to a value from ±40° to less than ±50° is applied to the opening parts (provided at two locations positioned at a 180° diagonal) in the center of the tube body 1 having an 8-inch inside diameter, even if openings that are at maximum 4 inches are used, there was confirmed to be no water leakage in a water leakage test conducted according to ASME Section X.

Therefore, due to the configuration according to the present example, the openings in the center part of the tube body 1 having an 8-inch inside diameter can be enlarged to 4 inches (opening ratio: 50%). Consequently, the configuration according to the present example is particularly suitable for a case in which the center part is provided with openings having an opening ratio greater than 37.5% and 50% or less relative to the inside diameter of the tube body 1. That the openings in the center part can be enlarged means that the amount of seawater let in and out can be increased, and the amount of water processed can be increased.

Furthermore, due to the absolute amount of lengthwise elongation being small (0.5-1 mm), the absolute amount of elongation can be minimized even when the elongation from the center toward the right and left ends exhibits erratic behavior in a center-port-type pressure vessel. As a result, it is possible to minimize the ellipsoidal deformation of the side port openings at both ends of a center-port-type pressure vessel, and to prevent water from leaking from the side ports.

As described above, a satisfactory pressure vessel that leaks no water can be obtained by setting the fiber angles to a value from ±60° to ±80° in the inward reinforcing layer 6 and outward reinforcing layer 8 in the center where the center inlet/outlet part 2 is provided, setting the fiber angle of the helical layer 4 to a value from ±40° to less than ±50°, and setting the fiber angles to a value from ±85° to ±89° in the inward reinforcing layers 7 and outward reinforcing layers 9 at both end parts where the end-part inlet/outlet parts 3 are provided.

Because the present example is configured as described above, strength is maintained not only by shearing force between the layers, but also by a force that divides the fibers of the helical layer 4, due to a broken away state (undulating state) of the breakaway parts 5 of the helical layer 4 being held by the inward reinforcing layers 6, 7 and the outward reinforcing layers 8, 9 enclosing the breakaway parts 5 therebetween.

Particularly, in a center-port-type pressure vessel, the openings of the center inlet/outlet part 2 must be larger in diameter, and deformation in the diametrical direction near the center inlet/outlet part 2 poses a problem, but this deformation in the diametrical direction near the center inlet/outlet part 2 can be minimized.

The lengthwise elongation of the tube body 1 can be satisfactorily minimized by having the fibers of the helical layer 4 be inclined at an angle of from ±40° to less than ±50° relative to the axial direction of the tube body.

Furthermore, a sturdy seal layer 20 can be formed on the innermost layer by adopting a configuration comprising a configuration comprising a base material in which the fiber orientation is randomly isotropic, and the same matrix resin as the matrix resin of the helical layer 4 and the reinforcing layers as the seal layer 20. Consequently, the barrel part of the tube body 1 is satisfactorily waterproof.

Consequently, in the present example, there is minimal inside diameter deformation even if the openings of the center inlet/outlet part are large, and a highly practical configuration is obtained by having little pressure-induced elongation from the center to both ends.

The invention claimed is:

1. A center-port pressure vessel used in seawater desalination or water purification by reverse osmosis, the pressure vessel comprising a tube body made of a fiber-reinforced resin, wherein the pressure vessel is characterized in that: a center inlet/outlet part that lets a liquid in or out is provided at an axial center of the tube body on a peripheral surface of the tube body; end-part inlet/outlet parts that let a fluid in or out are provided at axial ends of the tube body; the tube body is configured from a helical layer of which fibers are inclined at an angle of from ±40° to less than ±50° relative to a tube-body-axial direction, a reinforcing layer of which fibers are inclined at a greater angle than the helical layer relative to the tube-body-axial direction, and a seal layer constituting an innermost layer; a breakaway part that breaks away circumferentially outward from the seal layer is provided to a position on the helical layer where the center inlet/outlet part is provided; the reinforcing layer is configured from an inward reinforcing layer and an outward reinforcing layer provided respectively to inward and outward sides of the helical layer so as to enclose the breakaway part of the helical layer therebetween; and the center inlet/outlet part is provided so as to penetrate the inward reinforcing layer, the breakaway part of the helical layer, and the outward reinforcing layer.

2. A center-port pressure vessel used in seawater desalination or water purification by reverse osmosis, the pressure vessel comprising a tube body made of a fiber-reinforced resin, wherein the pressure vessel is characterized in that: a center inlet/outlet part that lets a liquid in or out is provided at an axial center of the tube body on a peripheral surface of the tube body; end-part inlet/outlet parts that let a fluid in or out are provided at axial ends of the tube body on the peripheral surface of the tube body; the tube body is configured from a helical layer of which fibers are inclined at an angle of from ±40° to less than ±50° relative to a tube-body-axial direction, a reinforcing layer of which fibers are inclined at a greater angle than the helical layer relative to the tube-body-axial direction, and a seal layer constituting an innermost layer; breakaway parts that break away circumferentially outward from the seal layer are provided to positions on the helical layer where the center inlet/outlet part and the end-part inlet/outlet parts are provided; the reinforcing layer is configured from inward reinforcing layers and outward reinforcing layers provided respectively to inward and outward sides of the helical layer so as to enclose the breakaway parts of the helical layer therebetween; and the center inlet/outlet part and the end-part inlet/outlet parts are provided so as to penetrate the inward reinforcing layers, the breakaway parts of the helical layer, and the outward reinforcing layers.

3. The pressure vessel according to claim 2, characterized in that the fibers of a center of the inward reinforcing layers or a center of the outward reinforcing layers are provided so as to be penetrated by the center inlet/outlet part and are inclined at an angle of from ±60° to ±80° relative to the tube-body-axial direction.

4. The pressure vessel according to claim 2, characterized in that the fibers of end parts of the inward reinforcing layers or end parts of the outward reinforcing layers are provided so as to be penetrated by the end-part inlet/outlet parts and are inclined at an angle of from ±85° to ±89° relative to the tube-body-axial direction.

5. The pressure vessel according to claim 3, characterized in that the fibers of end parts of the inward reinforcing layers or end parts of the outward reinforcing layers are provided so as to be penetrated by the end-part inlet/outlet parts and are inclined at an angle of from ±85° to ±89° relative to the tube-body-axial direction.

6. The pressure vessel according to claim 1 or 2, characterized in that the seal layer comprises a base material including fibers and a matrix resin, an orientation of the fibers is isotropic, and the matrix resin of the seal layer is the same as a matrix resin of the helical layer and the reinforcing layers.

7. The pressure vessel according to claim 6, characterized in that a resin content of the seal layer is greater than a resin content of the helical layer and the reinforcing layer.

8. The pressure vessel according to claim 7, characterized in that the resin content of the seal layer is set to 40 mass % or more and 85 mass % or less, and the resin content of the helical layer and the reinforcing layer is set to 20 mass % or more and 30 mass % or less.

9. The pressure vessel according to claim 1 or 2, characterized in that portions of the helical layer other than the breakaway parts are in contact with the seal layer.

\* \* \* \* \*